United States Patent
Boyle

(10) Patent No.: US 8,024,014 B2
(45) Date of Patent: Sep. 20, 2011

(54) WIRELESS TERMINAL, WIRELESS MODULE AND METHOD OF MANUFACTURING SUCH A TERMINAL

(75) Inventor: Kevin Boyle, Horsham (GB)

(73) Assignee: NXP B.V., Eindhoven (NL)

( * ) Notice: Subject to any disclaimer, the term of this patent is extended or adjusted under 35 U.S.C. 154(b) by 1198 days.

(21) Appl. No.: 11/574,010

(22) PCT Filed: Aug. 3, 2005

(86) PCT No.: PCT/IB2005/052596
§ 371 (c)(1),
(2), (4) Date: Feb. 20, 2007

(87) PCT Pub. No.: WO2006/018769
PCT Pub. Date: Feb. 23, 2006

(65) Prior Publication Data
US 2009/0023398 A1     Jan. 22, 2009

(30) Foreign Application Priority Data
Aug. 20, 2004   (EP) ..................................... 04255007

(51) Int. Cl.
*H04M 1/00*   (2006.01)

(52) U.S. Cl. ................. 455/575.1; 455/575.7; 455/90.3; 343/702; 343/736; 343/803

(58) Field of Classification Search ............... 455/575.1, 455/575.7, 90.3; 343/702, 736, 803
See application file for complete search history.

(56) References Cited

U.S. PATENT DOCUMENTS

| | | | |
|---|---|---|---|
| 6,448,932 B1 * | 9/2002 | Stoiljkovic et al. | 343/700 MS |
| 6,614,400 B2 * | 9/2003 | Egorov | 343/702 |
| 7,053,841 B2 * | 5/2006 | Ponce De Leon et al. | 343/702 |
| 2004/0140934 A1 * | 7/2004 | Korva | 343/700 MS |
| 2005/0017910 A1 * | 1/2005 | Park | 343/702 |
| 2005/0062649 A1 * | 3/2005 | Chiang et al. | 343/700 MS |

FOREIGN PATENT DOCUMENTS

| | | |
|---|---|---|
| EP | 0856906 A | 8/1998 |
| GB | 2381952 A | 5/2003 |
| WO | WO03094346 A | 11/2003 |

* cited by examiner

*Primary Examiner* — Temica M Beamer

(57) ABSTRACT

A wireless terminal is described, which is formed from a module (20) comprising a substrate, RF components (32, 33), an antenna (25), notably of the PIFA type, and a linkage part (30) for linking the antenna to the substrate. The RF components are placed in the vicinity of the linkage part or even on the linkage part without degrading the operation of the antenna. By placing the RF components on this link, an area is made available for circuitry on the substrate.

18 Claims, 4 Drawing Sheets

WIRELESS TERMINAL, WIRELESS MODULE AND METHOD OF MANUFACTURING SUCH A TERMINAL

FIELD OF THE INVENTION

The invention relates to wireless terminals. The invention is particularly, but not exclusively applicable to multiple standard telephones that are operable in accordance with telephone standards such as GSM (880 to 960 MHz), DCS (1710 to 1880 MHz) and PCS (1850 to 1990 MHz) and optionally Bluetooth$^{RTM}$ (ISM band in the 2.4 Ghz range).

The invention also relates to wireless modules having an antenna system and at least those components that are included in the coupling stages.

Furthermore, the invention relates to a method of manufacturing such a terminal.

BACKGROUND OF THE INVENTION

In the development of successive generations of cellular telephones, a great deal of effort has been made to reduce the volume of the wireless terminal, with the attendant desire to reduce the volume of the antenna whilst still maintaining its sensitivity. Externally mounted monopole antennas have been succeeded by internal antennas such as PIFAs (Planar Inverted-F Antennas) and notch antennas (see, for instance, patent document WO 03/094346). However, more efforts have to be made to further reduce the volume of the terminal and to facilitate its manufacture.

OBJECT AND SUMMARY OF THE INVENTION

It is an object of the invention to use all parts of the terminal in an efficient way.

According to the invention, a wireless terminal formed from a module comprising a substrate, RF components, an antenna system and a linkage part for linking the antenna to the substrate is characterized in that at least one RF component, which may be a part of the coupling stages, is placed in the vicinity of the linkage part.

In accordance with a first aspect of the invention, the RF parts are placed so as to raise the PCB ground (substrate).

In accordance with a second aspect of the invention, at least one RF component is mounted on the linkage part.

BRIEF DESCRIPTION OF THE DRAWINGS

The invention will now be described in more detail, by way of example, with reference to the accompanying drawings, wherein.

In the drawings, corresponding features are denoted by the same reference numerals.

DESCRIPTION OF EMBODIMENTS

Figure 1:
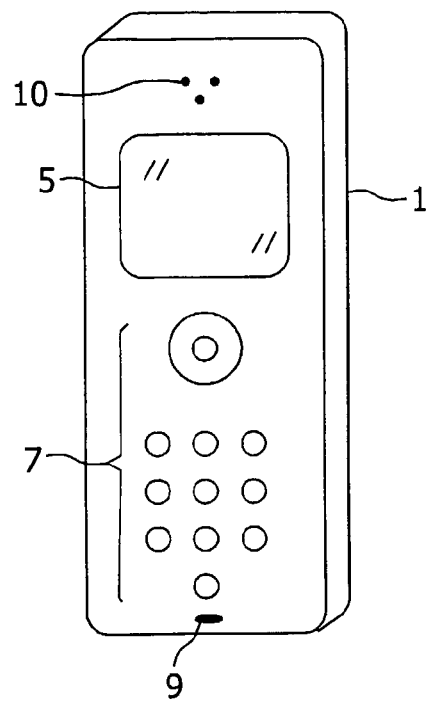
FIG. 1 shows a terminal according to the invention.

FIG. 1 shows a wireless terminal 1. This terminal comprises a housing and a wireless module shown in FIG. 2. In FIG. 1, the housing of the terminal 1 is provided with a screen 5, various buttons 7, a microphone 9 and a loudspeaker 10.

Figure 2:
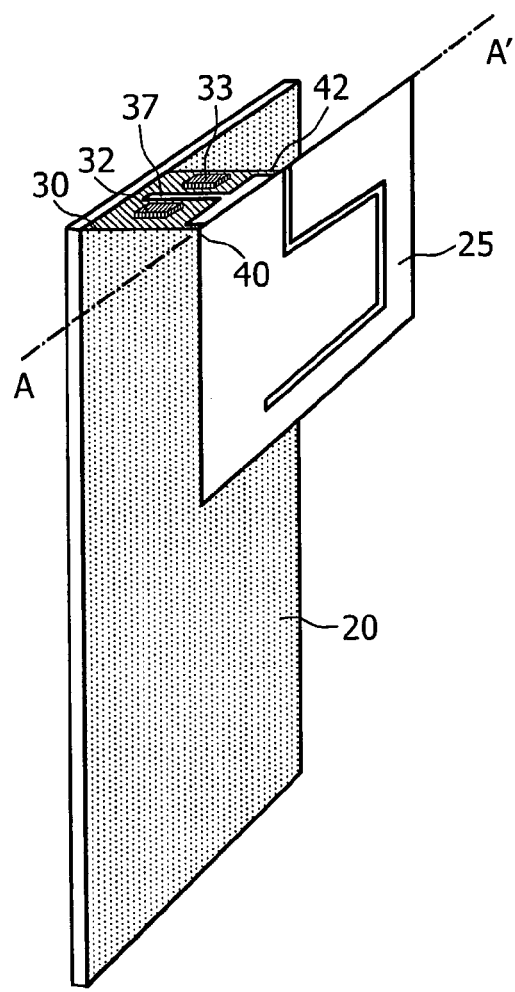
FIG. 2 shows a wireless module in accordance with a first embodiment of the invention.

The module shown in FIG. 2 is constituted by a main board 20 formed from a PCB (printed-circuit board), on which the usual elements or circuits for operation of the terminal are soldered. For the sake of clarity, these elements or circuits are not shown in FIG. 2. This module comprises an antenna 25, which is of the PIFA type. An antenna of this type is disclosed, for instance, in patent document WO 03/094346. This antenna, which is placed on an antenna substrate, is linked to the main board 20 via a linkage part 30.

In accordance with an aspect of the invention, this linkage part is a support for RF (radio frequency) components 32 and 33. These components are represented schematically above the linkage part. In practice, they can be mounted below this part 30. Note that FIG. 2 shows a differential slot 37, a feed tab 40 and a shorting tab 42. These elements are necessary for operation of the antenna.

Advantageously, the antenna substrate is constituted by a flexible support PCB, which also constitutes the linkage part 30. Initially, the antenna 25 has a planar structure. It is then bent along the line A-A' as illustrated in FIG. 2.

Since there is radiation from both the antenna 25 and the PCB (a voltage is fed between them), the location of the feed is not critical for the performance of the antenna 25/PCB-coupled system (the main board 26). It is realistic to make a sufficient area available on the antenna 25 to accommodate the entire RF circuit, without compromising the overall performance. Indeed, it is possible to improve the RF performance, because RF circuits made on a flexible PCB do not need to be realized above a ground layer. This leads to a more even distribution of current within these components and, consequently, to higher quality factors.

The differential slot 37, shown in FIG. 2, is necessary to prevent the antenna 25 from being short-circuited. In this embodiment, this is realized in the part of the structure that is orthogonal to the main PCB, i.e. the part that also supports the RF circuitry or elements. It could also be formed on the antenna top plate (parallel to the main PCB), though this is avoided here to prevent any possibility of user interaction. Indeed, the antenna slot may also be removed to avoid problems associated with user interaction. Instead, the functionality of the slot can be replicated, using discrete components (as disclosed in PCT pending patent application IB2004/002369 filed on 15 Jul. 2004).

Figure 3:
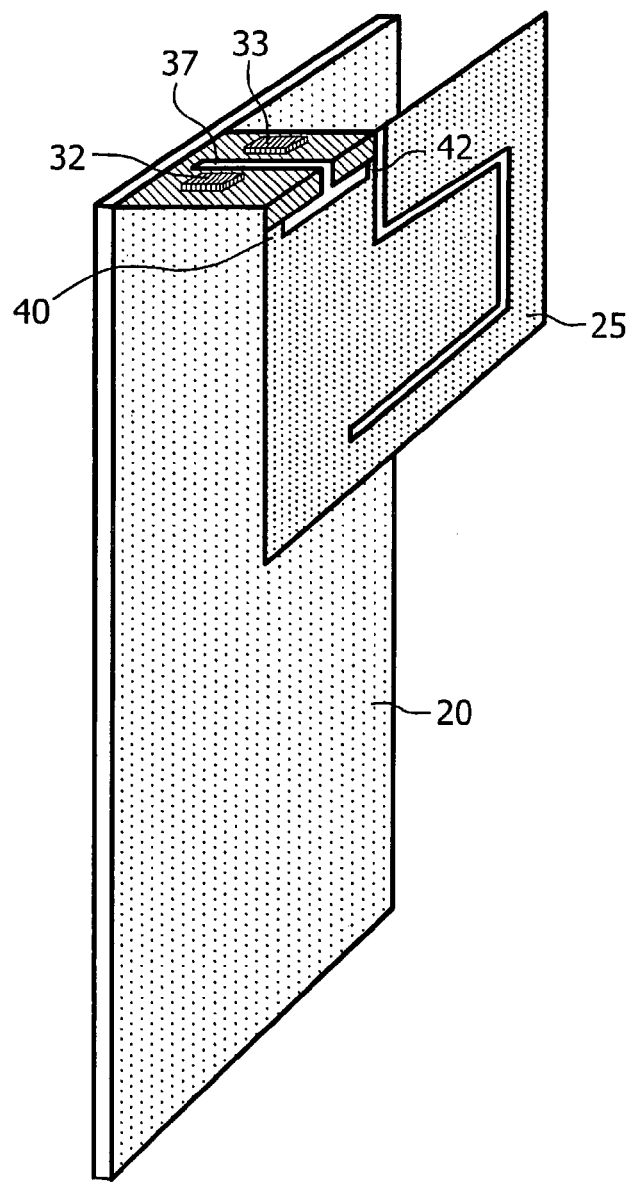
FIG. 3 shows a wireless module in accordance with a second embodiment of the invention.

A second embodiment of the invention is shown in FIG. 3. In accordance with this embodiment, the antenna feed 40 and the shorting tab 42 are moved on to the planar part of the antenna 25. It must be considered in this embodiment that there is likely to be a compromise between the area that can be made available for circuitry and the performance of the antenna when subject to user interaction (the user may put his finger over the feed area of the antenna).

Figure 4:
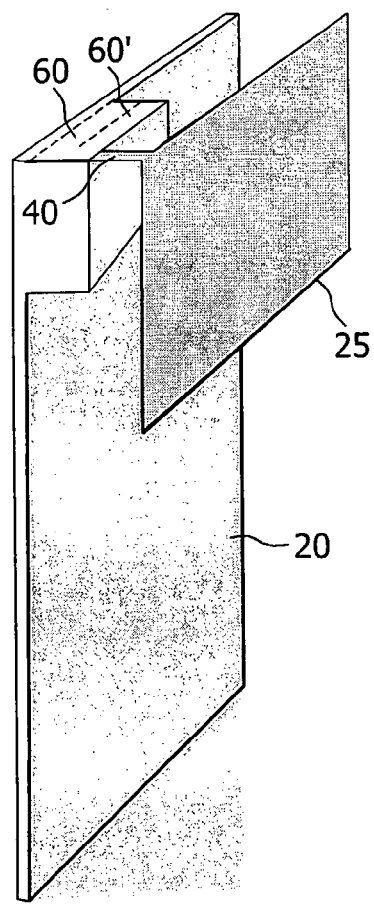
FIG. 4 shows a wireless module in accordance with a third embodiment of the invention.

A third embodiment of the invention is shown in FIG. 4.

The bandwidth and resonance frequency of PIFA antennas strongly depend on the antenna height above the PCB ground. RF modules tend to raise the effective ground level over a localized area, which tends to an increase of the antenna resonance frequency and a reduction of the bandwidth. The extent of this depends on the position of the module. According to the invention, the RF modules 60, 60' . . . are placed close to the antenna feed 40. Then, the effect is the least. Indeed, here the local ground level can be significantly increased without adversely affecting the performance of the antenna. To show this, the antenna configurations in FIG. 4 yield results as indicated in Table 1 below.

TABLE 1

|  | Resonance frequency (MHz) | Q @ 920 MHz | Q @ 1800 MHz | Q Sum |
|---|---|---|---|---|
| Conventional | 973 | 10.7 | 16.0 | 26.7 |
| FIG. 4 | 1468 | 11 | 11.7 | 22.7 |

This Table 1 illustrates the relations between the resonance frequency and the Q of a conventional arrangement (without RF module placed in a prominent way on the main board) and the arrangement illustrated in FIG. 4.

Raising the PCB ground near the feed raises the antenna resonance frequency but does not degrade the antenna Q and, consequently, the bandwidth. Indeed, the increased resonance frequency may be useful in dual-band applications, because the optimum resonance frequency is at approximately the geometric mean of the two frequencies concerned before the slot is applied. Because of this, RF modules 60, 60' ... can be stacked on top of each other without significantly affecting the overall performance. This saves PCB area.

Figure 5:
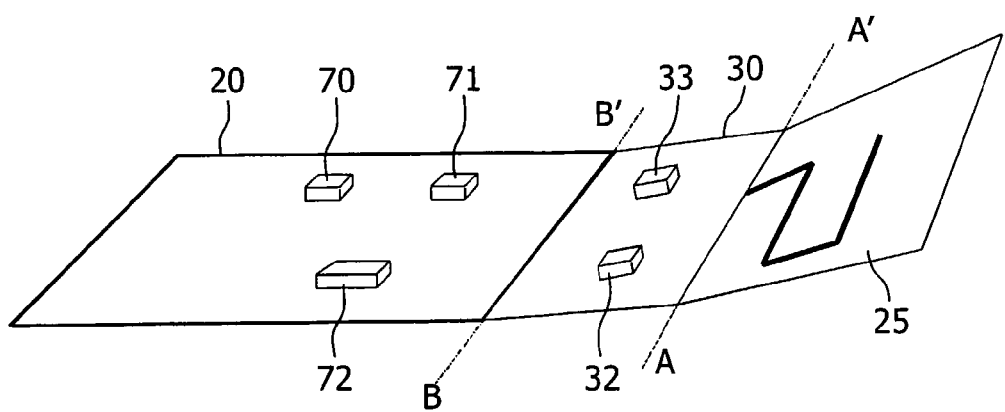
FIG. 5 shows a wireless module in accordance with a fourth embodiment of the invention.

A way of manufacturing a wireless module is shown in FIG. 5. All parts, namely, part 20, which already comprises the essential elements ( 70, 71, 72, . . . ) for operation of the module, part 30, which comprises the RF elements 32 and 33, and part 25, which constitutes the antenna, are arranged on the same support and are folded in another manufacturing step so as to give them the required shape. As already mentioned above, an alternative is to put the antenna and the RF elements on a flexible PCB, then link the flexible PCB to the main board 20 and fold them in the same way.

Figure 6:
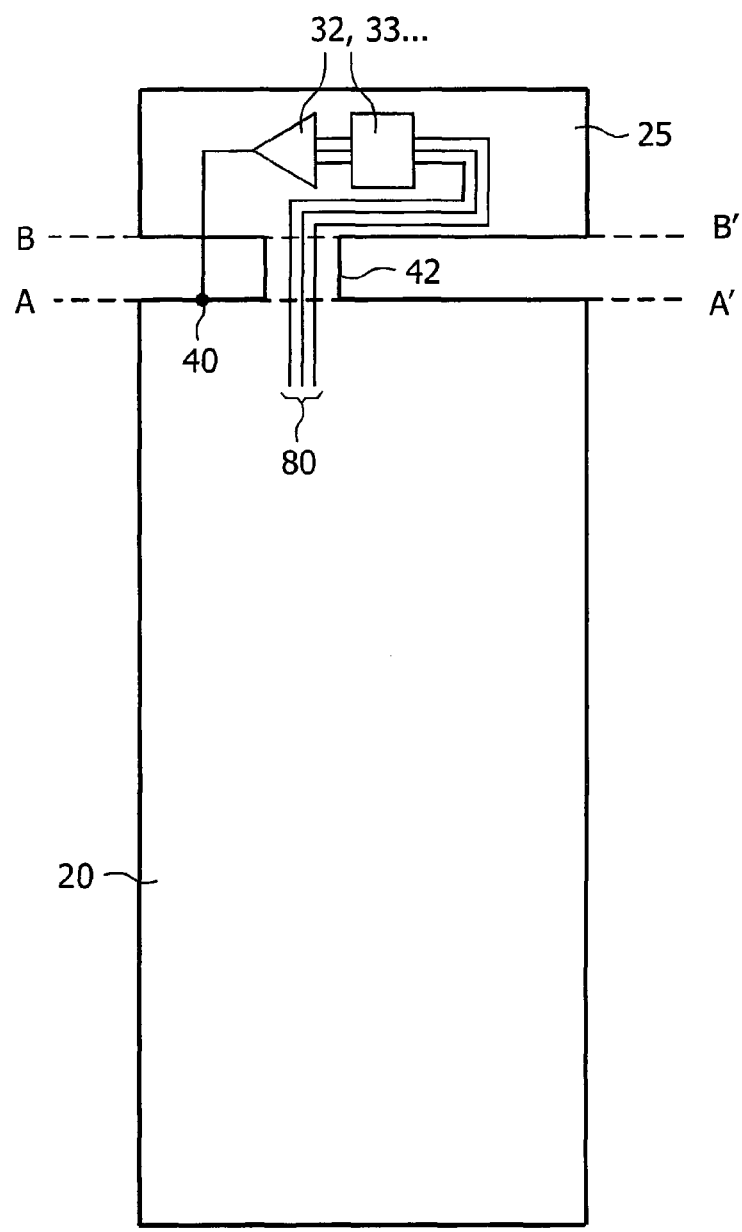
FIG. 6 shows a wireless module in accordance with a fifth embodiment of the invention.

Another interesting embodiment of the invention is shown in FIG. 6. The wireless module is represented in an unfolded state. This embodiment is based on the recognition that, in principle, a large part of the circuit currently located on the main PCB of a device may be moved on to the antenna part 25.

In a conventional arrangement, the RF signal is applied between the antenna and the main PCB, such that both contribute to radiation (to some extent). All components are located on the main PCB. This is convenient because all inputs (such as the microphone, keypad, battery, etc.) and outputs (such as the display, loudspeaker, etc.) also connect with the main PCB 25.

In FIG. 6, the antenna 25 is considered to be the part above the line A-A'. Its feed point is denoted by reference numeral 40. The PCB 20 is the part below this line. If the antenna is made with a flexible PCB or MID construction, components 32, 33 . . . can be located on the antenna structure and it can be considered as an extension of the main PCB. This saves space and allows use of the generally superior substrate used to form the antenna for RF components.

The problem with using the antenna as a circuit substrate is that power and data lines must connect back to the main PCB 20 in order to subsequently connect to required inputs and outputs. Such connections would normally disturb the performance of the antenna. Hence, an antenna is made with a shorting tab 42 that is connected to ground of the main PCB. Data and power lines can then be run above or within this tab without disturbing the performance of the antenna as denoted by reference numeral 80 in FIG. 6.

The shorting tab will cause an impedance transformation as described in patent document WO 02/06005. A slot between the feed and shorting tabs can be used to control the level of this transformation.

The antenna may be a planar monopole-like structure or a PIFA (wherein folds would be applied along the lines A-A' and B-B').

The invention claimed is:

1. A wireless terminal formed from a module comprising a main board, RF components, an antenna placed on an antenna substrate and a linkage substrate for linking the antenna to the main board, characterized in that at least one RF component is mounted on the linkage substrate, wherein the antenna substrate comprises a planar structure and wherein the main board and the planar structure are separated by the linkage substrate.

2. A wireless terminal as claimed in claim 1, characterized in that at least one RF component is mounted on the antenna substrate.

3. A wireless terminal as claimed in claim 1, characterized in that the antenna substrate and the linkage substrate are made from the same malleable substrate in the form of a flexible PCB and the malleable substrate is folded to form the linkage substrate.

4. A wireless terminal as claimed in claim 1, characterized in that the antenna is one of the PIFA type.

5. A wireless terminal as claimed in claim 4, wherein the antenna is fed by way of a feed tab, characterized in that the feed tab is placed on the linkage substrate.

6. A wireless terminal as claimed in claim 4, wherein antenna placed on the antenna substrate is fed by way of a feed tab, characterized in that the feed tab is placed on the antenna substrate.

7. A wireless module comprising an antenna placed on an antenna substrate, a main board notably accommodating main circuits, RF components, and a linkage substrate for linking the antenna substrate to the main board, characterized in that at least one RF component is placed on the antenna substrate, wherein the linkage substrate comprises a shorting tab and wherein data and power lines run above or within the shorting tab.

8. A method of manufacturing a wireless terminal as claimed in claim 1, characterized in that the method comprises the steps of:
  starting from a PCB provided with a pattern of the antenna substrate, main circuits are at least one of the RF component,
  splitting up the PCB into three parts, a first part being allocated to the main board, a second part being allocated to the antenna substrate, and a linkage part being allocated to the linkage substrate for linking the first part with the second part,
  placing at least various main circuits on the first part, on the second part, and some RF components on the linkage part,
  folding these parts in such a way that they can be placed in a housing suitable for the wireless terminal.

9. The wireless terminal of claim 1 wherein the planar structure of the antenna substrate is parallel to the main board.

10. The wireless module of claim 7, characterized in that the antenna substrate and the linkage substrate are made from the same malleable substrate in the form of a flexible PCB and the malleable substrate is folded to form the linkage substrate.

11. A wireless terminal formed from a module comprising a main board, RF components, an antenna mounted on an antenna substrate and a linkage substrate for linking the antenna to the main board, characterized in that at least one RF component is mounted on the antenna substrate, characterized in that the antenna substrate and the linkage substrate are made from a malleable substrate in the form of a flexible PCB.

12. A wireless terminal as claimed in claim 11, characterized in that the antenna is one of the PIFA type.

13. A method of manufacturing a wireless terminal as claimed in claim 11, characterized in that the method comprises the steps of:
- starting from a PCB provided with a pattern of the antenna substrate, the main circuits are at least one of the RF components,
- splitting up the PCB into three parts, a first part being allocated to the main board, a second part being allocated to the antenna substrate, and a linkage part being allocated to the linkage substrate for linking the first part with the second part,
- placing at least various main circuits on the first part and on the second part,
- folding these parts in such a way that they can be placed in a housing suitable for the wireless terminal.

14. The wireless terminal of claim 11 wherein the antenna substrate comprises a planar structure and wherein the main board and the planar structure are separated by the linkage substrate.

15. The wireless terminal of claim 14 wherein the planar structure of the antenna substrate is parallel to the main board.

16. A wireless terminal formed from a module comprising a main board, RF components, an antenna placed on an antenna substrate and a linkage substrate for linking the antenna to the main board, characterized in that at least one RF component is mounted on the antenna substrate, wherein the antenna substrate comprises a planar structure and wherein the main board and the planar structure are separated by the linkage substrate.

17. The wireless terminal of claim 16 wherein the planar structure is parallel to the main board.

18. The wireless terminal of claim 1 wherein the main board, the linkage substrate, and the antenna substrate are formed from the same PCB.

\* \* \* \* \*